United States Patent
Lee et al.

(10) Patent No.: US 9,323,124 B2
(45) Date of Patent: *Apr. 26, 2016

(54) DISPLAY APPARATUSES AND METHODS OF OPERATING THE SAME

(71) Applicant: Samsung Electronics Co., Ltd., Suwon-Si, Gyeonggi-Do (KR)

(72) Inventors: Sung-hoon Lee, Yongin-si (KR); Do-Hyun Kim, Seoul (KR); Sang-wook Kim, Yongin-si (KR); Chang-jung Kim, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 52 days.

This patent is subject to a terminal disclaimer.

(21) Appl. No.: 14/082,584

(22) Filed: Nov. 18, 2013

(65) Prior Publication Data

US 2014/0071367 A1    Mar. 13, 2014

Related U.S. Application Data

(63) Continuation of application No. 12/458,312, filed on Jul. 8, 2009, now Pat. No. 8,610,652.

(30) Foreign Application Priority Data

Dec. 12, 2008   (KR) .................. 10-2008-0126533

(51) Int. Cl.
*G09G 3/36*     (2006.01)
*G02F 1/1368*   (2006.01)

(52) U.S. Cl.
CPC ............ *G02F 1/1368* (2013.01); *G09G 3/3648* (2013.01); *G09G 2330/027* (2013.01)

(58) Field of Classification Search
CPC ................................. G06G 3/30; H01H 11/00
USPC ................................................... 345/156–173
See application file for complete search history.

(56) References Cited

U.S. PATENT DOCUMENTS

| 6,259,502 B1 | 7/2001 | Komatsu |
| 7,462,514 B2 | 12/2008 | Shiroguchi et al. |
| 7,768,611 B2 | 8/2010 | Tsaur et al. |
| 8,610,652 B2* | 12/2013 | Lee et al. ........................ 345/87 |
| 2002/0126108 A1* | 9/2002 | Koyama et al. ................ 345/204 |

(Continued)

FOREIGN PATENT DOCUMENTS

| JP | 2002-296564 A | 10/2002 |
| JP | 2003-050405 A | 2/2003 |

(Continued)

OTHER PUBLICATIONS

Korean Office Action dated Aug. 19, 2014 for corresponding Korean Application No. 10-2008-0126533.

*Primary Examiner* — Grant Sitta
(74) *Attorney, Agent, or Firm* — Harness, Dickey & Pierce, P.L.C.

(57) ABSTRACT

Provided are display apparatuses and methods of operating the same. In a display apparatus, a display image may be continuously held for longer than about 10 msec after the power of the display panel is turned off. The display apparatus may indicate a liquid crystal display (LCD) apparatus including an oxide thin film transistor (TFT). Off leakage current of the oxide TFT may be less than about $10^{-14}$ A.

21 Claims, 8 Drawing Sheets

(56) References Cited

U.S. PATENT DOCUMENTS

| | | |
|---|---|---|
| 2006/0125742 A1* | 6/2006 | Sekiguchi et al. ............... 345/80 |
| 2006/0244107 A1 | 11/2006 | Sugihara et al. |
| 2007/0081380 A1* | 4/2007 | Atwood et al. ................ 365/150 |
| 2007/0262946 A1 | 11/2007 | Chen et al. |
| 2008/0128689 A1* | 6/2008 | Lee et al. ......................... 257/43 |
| 2008/0142797 A1* | 6/2008 | Lee et al. ......................... 257/43 |
| 2009/0021486 A1 | 1/2009 | Chaudhri et al. |
| 2009/0153056 A1 | 6/2009 | Chen et al. |

FOREIGN PATENT DOCUMENTS

| | | |
|---|---|---|
| JP | 2003-162245 A | 6/2003 |
| JP | 2005-321739 A | 11/2005 |
| JP | 2006-139145 A | 6/2006 |
| JP | 2006-178435 A | 7/2006 |
| KR | 2007-0028663 A | 3/2007 |
| KR | 2008-0017682 A | 2/2008 |

* cited by examiner

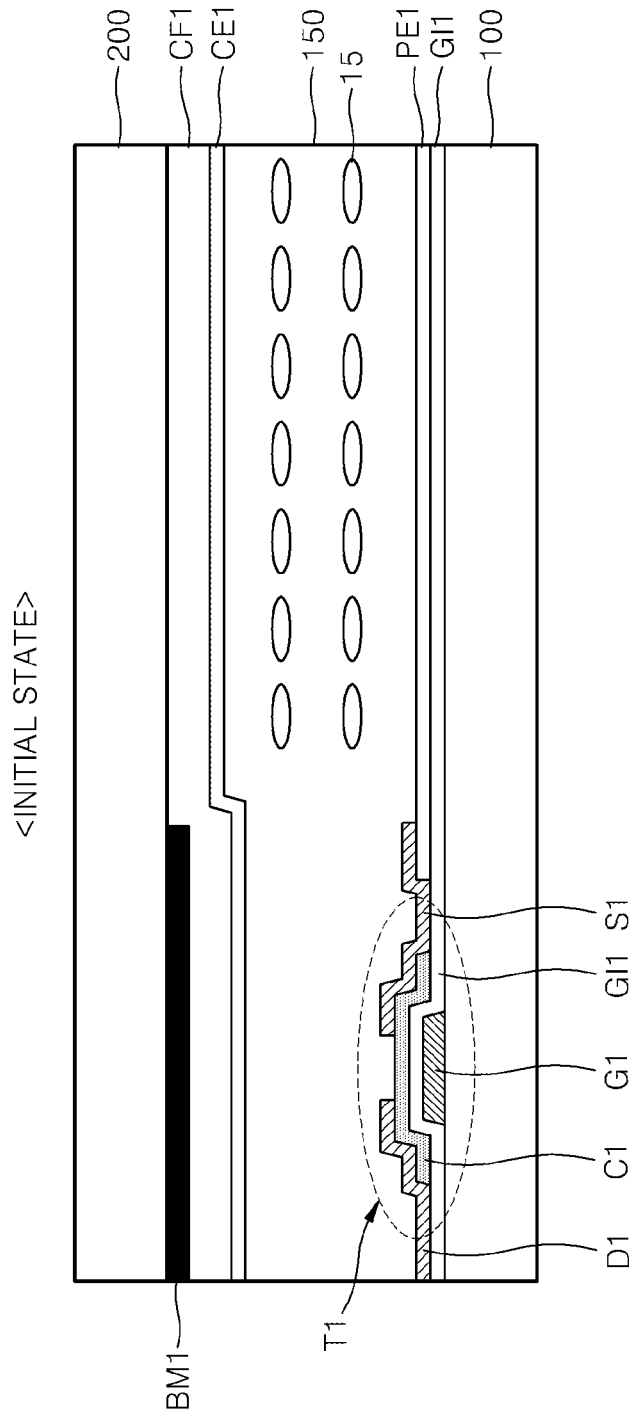

DISPLAY APPARATUSES AND METHODS OF OPERATING THE SAME

CROSS-REFERENCE TO RELATED APPLICATIONS

This application is a continuation of U.S. application Ser. No. 12/458,312, filed on Jul. 8, 2009, which claims priority under 35 U.S.C. §119 to Korean Patent Application No. 10-2008-0126533, filed on Dec. 12, 2008, in the Korean Intellectual Property Office (KIPO), the entire contents of each of which is incorporated herein by reference.

BACKGROUND

1. Field

One or more embodiments relate to display apparatuses and methods of operating the same.

2. Description of the Related Art

Liquid crystal displays (LCDs) have been developed to replace cathode-ray tubes (CRTs) as display apparatuses. In particular, thin film transistor liquid crystal displays (TFT-LCDs) having pixels using thin film transistors (TFTs) as switching devices may realize high quality color images and may be used for manufacturing large-sized products. Thus, the TFT-LCD has been highlighted for use in, for example, laptop monitors, monitors for personal computers (PCs) and televisions (TVs).

A TFT-LCD may have a structure in which an array substrate and a color filter substrate are bonded with a liquid crystal layer interposed in between. The array substrate may have TFT switching devices and pixel electrodes. The color filter substrate may have color filters and common electrodes. When the TFTs are turned on, a voltage may be applied between the pixel electrodes and the common electrodes, changing the state of the liquid crystal layer in order to change the displayed image.

Most of the currently commercialized TFT-LCDs employ a TFT that has a channel layer formed of amorphous silicon or polycrystalline silicon. However, silicon-based channel layer TFTs have relatively large leakage currents.

SUMMARY

One or more embodiments include display apparatuses capable of continuously displaying an image during a long period of time in a power off-state. One or more embodiments include a method of operating display apparatuses.

One or more embodiments may include a display apparatus including a first substrate comprising a thin film transistor (TFT) and a pixel electrode connected to the TFT, the TFT configured to maintain a display image for longer than about 10 ms after switching to an off-state; a second substrate disposed to face the first substrate and comprising a common electrode; and a liquid crystal layer disposed between the first substrate and the second substrate.

An off leakage current of the TFT may be less than about $10^{-14}$ A. The TFT may be an oxide TFT. A channel layer of the TFT may include one of a ZnO-based material, an InO-based material and a SnO-based material. The TFT may be an enhancement mode TFT. The TFT may be a depletion mode TFT. The display apparatus may be one of a transmissive type, a reflective type, and a transflective type apparatus.

The TFT may include a capacitor on the first substrate and the display apparatus may be configured to maintain a charge on the capacitor for longer than about 10 ms after the TFT is switched to the off-state. The TFT may be a bottom gate TFT, a top gate TFT or a dual gate TFT. The display apparatus may be a digital picture frame. The display apparatus may be an electronic paper (e-paper).

One or more embodiments may include methods of displaying a still image by using the display apparatuses, the methods including the operations of applying a voltage between the pixel electrode and the common electrode by turning on the TFT (thin film transistor); and turning off the TFT.

The method may further include the operation of performing a refresh operation to the TFT in an off-state so as to re-apply the voltage. The TFT may be turned off in response to an applied negative (−) voltage or a voltage of about 0V. The TFT may be biased to an off leakage current of less than about $10^{-14}$ A. The method may include operating an oxide TFT. The method may include operating a TFT with a channel including at least one of a ZnO-based material, an InO-based material and a SnO-based material. The method may include operating a digital picture frame and/or electronic paper (e-paper).

BRIEF DESCRIPTION OF THE DRAWINGS

Example embodiments will be more clearly understood from the following brief description taken in conjunction with the accompanying drawings. FIGS. 1-6C represent non-limiting, example embodiments as described herein.

FIGS. 1 and 2 are cross-sectional diagrams of a display apparatus according to an example embodiment.

FIGS. 3 and 4 are graphs of gate voltage (Vg) as a function of drain current (Id) for TFTs according to example embodiments.

FIG. 5 is a graph of gate voltage (Vg) as a function of drain current (Id) for an amorphous silicon TFT in a conventional liquid crystal display (LCD) apparatus; and FIGS. 6A-6C are cross-sectional diagrams illustrating a method of operating a display apparatus according to an example embodiment.

Figure 1:
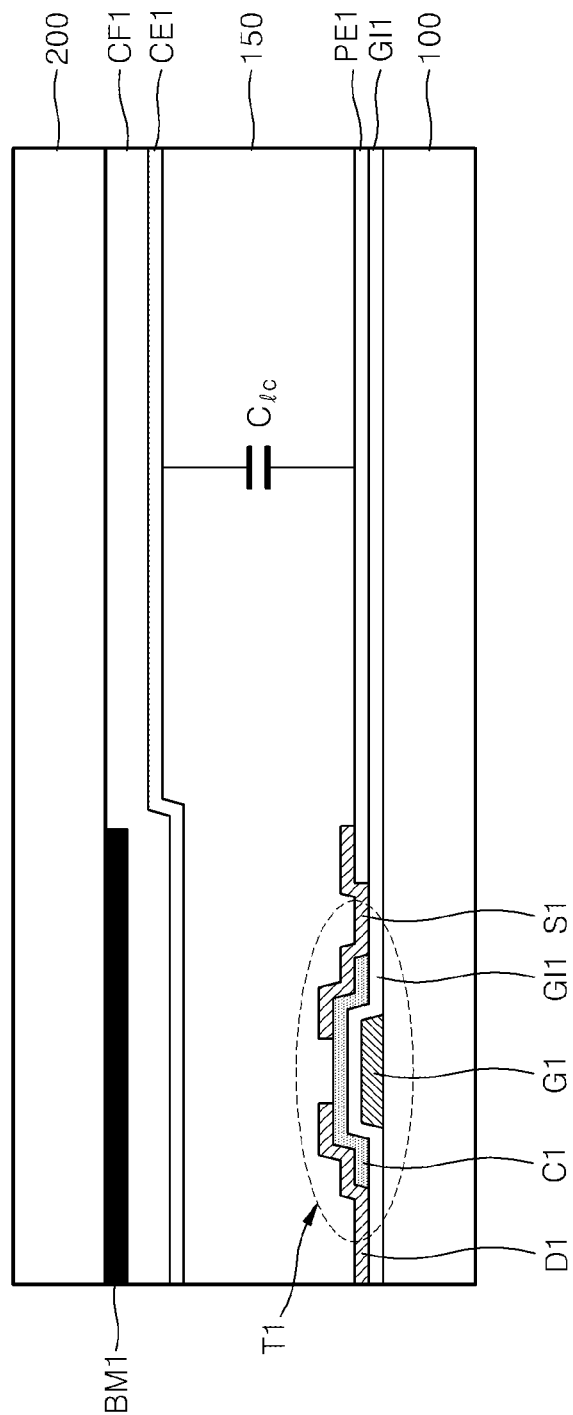

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Example embodiments will now be described more fully with reference to the accompanying drawings, in which example embodiments are shown. Example embodiments may, however, be embodied in many different forms and should not be construed as being limited to the embodiments set forth herein; rather, these embodiments are provided so that this disclosure will be thorough and complete, and will fully convey the concept of example embodiments to those of ordinary skill in the art. In the drawings, the thicknesses of layers and regions are exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. Other words used to describe the relationship between elements or layers should be interpreted in a like fashion (e.g., "between" versus "directly between," "adjacent" versus "directly adjacent," "on" versus "directly on"). As used herein the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 is a cross-sectional diagram of a display apparatus according to an example embodiment. Referring to FIG. 1, a thin film transistor (TFT) T1 and a pixel electrode PE1 may be on a first substrate 100. A color filter CF1 and a common electrode CE1 may be on a second substrate 200. The first substrate 100 and the second substrate 200 may be separated and face each other. A liquid crystal layer 150 including a plurality of liquid crystal molecules may be interposed between the first substrate 100 and the second substrate 200.

A gate electrode G1 may be on the first substrate 100 and a gate insulating layer GI1 may be formed on (e.g., to cover) the gate electrode G1. A channel layer C1 may be on the gate insulating layer GI1 above the gate electrode G1. A source electrode S1 and a drain electrode D1 may each contact a different end of the channel layer C1. The gate electrode G1, the gate insulating layer GI1, the channel layer C1, the source electrode S1 and the drain electrode D1 may form the TFT T1.

The channel layer C1 may be, for example, an oxide semiconductor layer. For example, the channel layer C1 may include a ZnO-based material, a InO-based material or an SnO-based material. A ZnO-based channel layer C1 may further include at least one element selected from group 13 elements (e.g., In and Ga), group 14 elements (e.g., Sn) or transition metals (e.g., Hf). Examples of a ZnO-based channel layer C1 may include ZnO, InZnO, GaInZnO, HfInZnO, and SnZnO. An InO-based channel layer C1 may further include group 14 elements (e.g. Sn). An off-state leakage current of the TFT T1 including the channel layer C1 may be less than about $10^{-14}$ A (e.g., less than about $10^{-17}$ A). Although the TFT T1 of FIG. 1 is depicted as a bottom gate structure, the TFT T1 may be configured differently, for example, a top gate structure or a double gate structure.

A pixel electrode PE1 may be connected to the source electrode S1 of the TFT T1 and may on the first substrate 100. The pixel electrode PE1 may extend toward a side of the source electrode S1. The manner in which the TFT T1 and the pixel electrode PE1 are connected may vary. For example, in FIG. 1 the pixel electrode PE1 is shown on the gate insulating layer GI1 and the source electrode S1 is shown covering an end portion of the pixel electrode PE1. However, an insulating layer (not shown) may be on the gate insulating layer GI1 so as to cover the TFT T1 and the pixel electrode PE1 may be on the insulating layer and contacting the source electrode S1.

A black matrix BM1 having an aperture area may be on a portion of a bottom surface of the second substrate 200. The aperture area may be positioned to be above the pixel electrode PE1. The color filter CF1 may be on the remaining portion of the bottom surface of the second substrate 200 where the black matrix BM1 is not located. The color filter CF1 may extend on the black matrix BM1. The common electrode CE1 may be on a bottom surface of the color filter CF1. The common electrode CE1, the pixel electrode PE1, and the liquid crystal layer 150 between the common electrode CE1 and the pixel electrode PE1 may form a capacitor (hereinafter, referred to as a 'first capacitor'). The black matrix BM1, the color filter CF1, and the common electrode CE1 are not limited to the structures shown in FIG. 1 and may be other structures.

Figure 2:
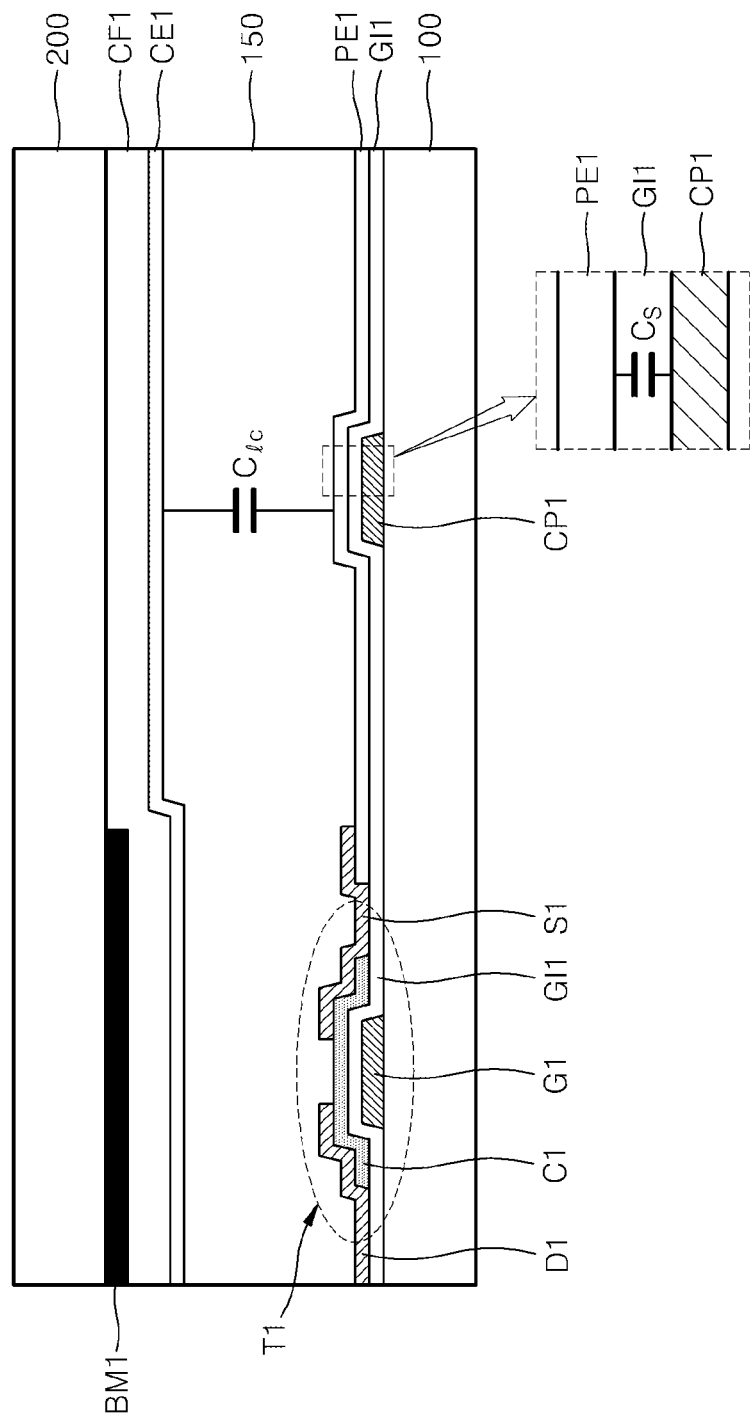

FIG. 2 is a cross-sectional diagram of a display apparatus according to an embodiment. The display apparatus of FIG. 2 may have a structure in which a capacitor electrode CP1 is included in the structure of the display apparatus of FIG. 1. Referring to FIG. 2, the capacitor electrode CP1 may be separated from a gate electrode G1 on a first substrate 100. A gate insulating layer GI1 may be formed on (e.g., to cover) the capacitor electrode CP1, and a pixel electrode PE1 may be formed on (e.g., to cover) the gate insulating layer GI1 on the capacitor electrode CP1. The capacitor electrode CP1, the pixel electrode PE1 corresponding to the capacitor electrode CP1, and the gate insulating layer GI1 between the capacitor electrode CP1 and the pixel electrode PE1 may form a capacitor (hereinafter, referred to as a 'second capacitor'). When the structure of FIG. 2 is considered as a circuit, the display apparatus of the embodiment of FIG. 2 may have a structure in which the first and second capacitors are connected in parallel with a TFT T1. Although the capacitor electrode CP1 is separately formed with respect to the gate electrode G1 in the structure of FIG. 2, example embodiments are not limited to the structure of FIG. 2. For example, a part of another gate electrode disposed around the gate electrode G1 may be used as a capacitor electrode.

The structures shown in FIGS. 1 and 2 may be cross-sectional structures of a unit pixel and a plurality of unit pixels may be arrayed to form a plurality of rows and columns. A plurality of gate lines and a plurality of data lines may be arrayed to cross each other. The TFT T1 and the pixel electrode PE1 of FIG. 1, and/or the TFT T1, the capacitor electrode CP1, and/or the pixel electrode PE1 of FIG. 2, may be arranged in a unit pixel region that may be defined by each of the gate lines and each of the data lines.

When a voltage is applied to the common electrode CE1 of FIG. 1 or FIG. 2 and the TFT T1 is turned on, the voltage of the drain electrode D1 may applied to the pixel electrode PE1 so that an electric potential difference may be generated between the pixel electrode PE1 and the common electrode CE1. According to this electric potential difference, a state of the liquid crystal layer 150 may be controlled. By applying an appropriate voltage to each of the pixel electrodes PE1 in every pixel (e.g., performing a 'screen scan') the state of the liquid crystal layer 150 in each of the pixels may be controlled and an image may be realized. When the TFT T1 is turned on, electric charges may accumulate in the first capacitor in the case of the display apparatus of FIG. 1 and electric charges may accumulate in the first and second capacitors in the case of the display apparatus of FIG. 2.

In a display apparatus according to example embodiments of FIGS. 1 and 2, because the TFT T1 may have a relatively small and/or decreased off-state leakage current, the electric potential difference between the pixel electrode PE1 and the common electrode CE1 may be maintained during a relatively long and/or increased period of time although the TFT T1 is turned off. An image may be displayed during a relatively long and/or increased period of time even in an off-state of the TFT T1.

Equation 1 below shows a voltage holding time (VHT) of the pixel electrode PE1 with respect to the common electrode CE1 after the TFT T1 is turned off.

$$VHT = R_{off} \times C_T = \frac{V_P}{I_I} \times C_T \quad \text{Equation 1}$$

In equation 1, $R_{off}$ and $C_T$ respectively indicate an off resistance and a load capacity of the TFT T1. The off resistance $R_{off}$ of the TFT T1 may be defined as the value obtained by dividing voltage $V_P$ (hereinafter, referred to as a 'pixel voltage') of the pixel electrode PE1 with respect to the drain electrode D1 by a leakage current $I_I$ of the TFT T1. In the case of the display apparatus of FIG. 1, the load capacity $C_T$ of the TFT T1 may be defined as a capacitance $C_{IC}$ of the first capacitor (the first capacitor including the pixel electrode PE1, the common electrode CE1, and the liquid crystal layer 150) between the pixel electrode PE1 and the common electrode CE1. In the case of the display apparatus of FIG. 2, the load capacity $C_T$ of the TFT T1 may be defined as the sum of the capacitance $C_{IC}$ of the first capacitor and the capacitance $C_S$ of the second capacitor.

The leakage current $I_I$ of the TFT T1 in the display apparatus according to the example embodiments of FIGS. 1 and 2 may be less than about $10^{-14}$ A (e.g., between about $10^{-17}$ A to about $10^{-18}$ A). The pixel voltage VP may be between about −5V to about +5V and the load capacity $C_T$ of the TFT T1 may be about 1 pF. Assuming that the pixel voltage $V_P$ is about 1V and the load capacity $C_T$ of the TFT T1 is about 1 pF, when the leakage current $I_I$ of the TFT T1 is about $10^{-17}$ A, the VHT may be about $10^5$ sec (about 28 hours). The voltage of the pixel electrode PE1 with respect to the common electrode CE1 may be maintained for about 28 hours although the TFT T1 is turned off. Maintenance of the voltage of the pixel electrode PE1 with respect to the common electrode CE1 may result in maintenance of the light transmittance of the liquid crystal layer 150 and a screen image may be continuously displayed.

When a TFT T1 having a reduced leakage current $I_I$ is included in a display apparatus (e.g., according to FIGS. 1 and 2), a display apparatus capable of holding an image, although the power of the display panel is turned off, may be realized. However, in the case where the display apparatus is of a transmissive type, it may be required that backlight power continues to be supplied. According to example embodiments, it may be possible to fabricate a display apparatus capable of holding an image for a relatively long and/or increased period of time even though power to the display is turned off. For example, a display apparatus according to example embodiments may be used as a digital picture frame or an electronic paper (e-paper).

With respect to a conventional liquid crystal display (LCD) apparatus, when a power of a display panel is turned off the liquid crystal may be immediately returned to its original position so that the display is reset and the image removed. Because a TFT formed of amorphous silicon or polycrystalline silicon may have a relatively large leakage current of about $10^{-9}$ A at a gate voltage of about 0V, when the TFT is turned off, electric charges accumulated in the pixel electrode may be leaked during a relatively short and/or decreased period of time via the TFT. Referring to Equation 1, in the case where the leakage current $I_I$ is about $10^{-9}$ A, the pixel voltage $V_P$ may be about 1V and the load capacity $C_T$ of the TFT may about 1 pF, resulting in a VHT of about $10^{-3}$ sec (10 ms), a relatively short and/or decreased period of time. When the TFT is turned off, a liquid crystal may be returned to its original position after about $10^{-3}$ sec. Accordingly, in order to maintain an image in a conventional LCD apparatus, the TFT may be turned on at relatively short and/or decreased intervals (e.g., repeated screen scans). Because the TFT formed of amorphous silicon or polycrystalline silicon may have a relatively large minimum leakage current of about $10^{-13}$ A it may be difficult to fabricate a conventional display apparatus with an increased VHT.

Figure 3:
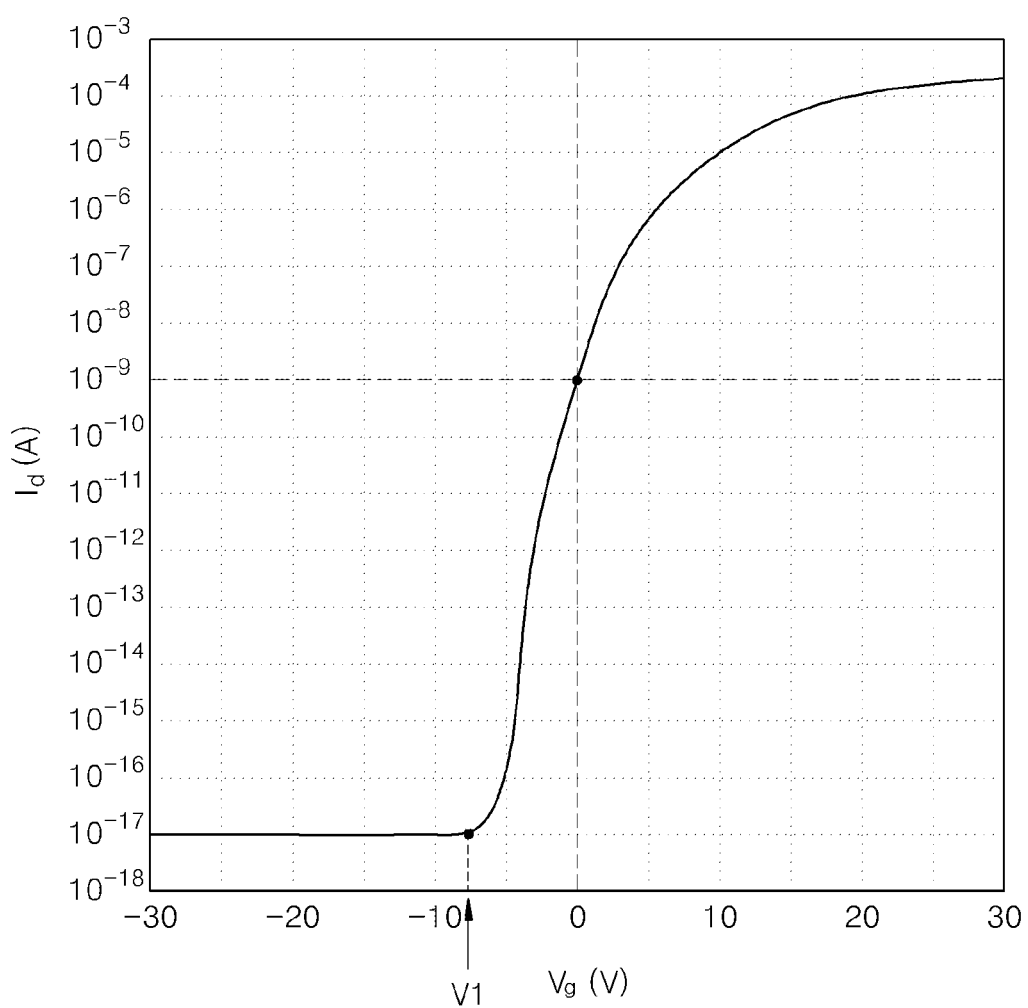
Figure 4:
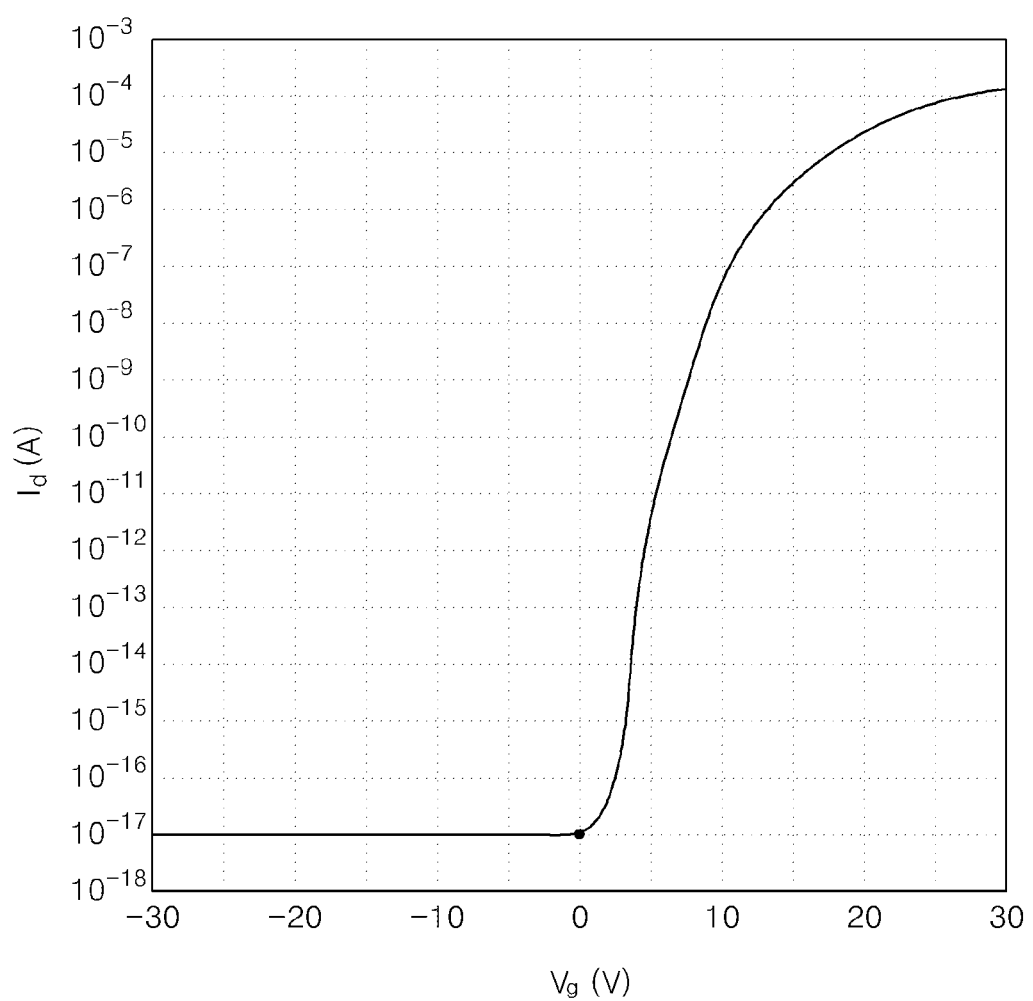

FIGS. 3 and 4 are graphs of gate voltage (Vg) as a function of drain current (Id) for TFTs that may be used as TFTs of a display apparatus according to example embodiments. The TFTs of FIGS. 3 and 4 have an off-state leakage current of about $10^{-17}$ A. However, the TFT of FIG. 4 has an off-state at a higher voltage than the TFT of FIG. 3. The TFT of FIG. 3 may be a depletion mode TFT having an off-state at a negative voltage of about V1 (hereinafter, referred to as the 'first voltage') and the first voltage V1 may be used as an off voltage. By applying the first voltage V1 to a gate electrode after a screen scan is performed once, an image realized by performing the screen scan may be continuously displayed during a relatively long and/or increased period of time. The TFT of FIG. 4 may be an enhancement mode TFT having an off-state of about 0V. When this TFT is used, although power supplied to the display panel may be turned off after a screen scan is performed once, an image may be continuously displayed for a relatively long and/or increased period of time. Power consumption may be reduced compared to a conventional display apparatus which may be required to repeatedly perform a screen scan at relatively short and/or decreased intervals in order to continuously display an image.

A threshold voltage of the TFT used in the display apparatus according to example embodiments may be adjusted using various methods and it may be possible to fabricate the TFT of FIG. 3 so that it may have about the performance of the TFT of FIG. 4. For example, threshold voltage may be adjusted by forming a charge trap region or layer in a gate insulating layer, or between the gate insulating layer and a channel layer, and then trapping electric charges in the charge trap region or layer. If the channel layer is n-type, electrons trapped in the charge trap region or layer may reduce the number of electrons in the channel layer resulting in an increased threshold voltage. Threshold voltage may be adjusted by forming a TFT having a double-gate structure. Applying a high voltage to the double gates of the double-gate structure, may be trap electrons in two gate insulating layers so that the threshold voltage of the TFT may be increased. Threshold voltage may be adjusted by controlling the doping concentration of the channel layer. For example, compensation doping may be performed by injecting opposite type impurities in the channel layer. Using example methods described above or other methods which are not described here, it is possible to make the TFT of FIG. 3 with the performance of the TFT of FIG. 4 for use as a switching device of a display apparatus according to example embodiments. However, as described above, the TFT of FIG. 3 may be used without changing its performance.

In a display apparatus according to example embodiments, an image may be continuously displayed during a relatively long and/or increased period of time even though the TFT is turned off. However, turning on the TFT by performing a refresh scan during a VHT may refresh the image. For example, when a leakage current $I_l$ of the TFT is about $10^{-17}$ A and when the VHT is about 28 hours, screen resolution may remain clear state by performing the refresh scan at about every 28 hours. The refresh scan interval may be increased over a conventional refresh scan interval. Accordingly, when a display apparatus according to example embodiments is used as a digital picture frame or an e-paper, it may be possible to reduce power consumption. When a moving picture is realized using the display apparatus according to example embodiments, methods of operating a conventional LCD apparatus may be used.

Figure 5:
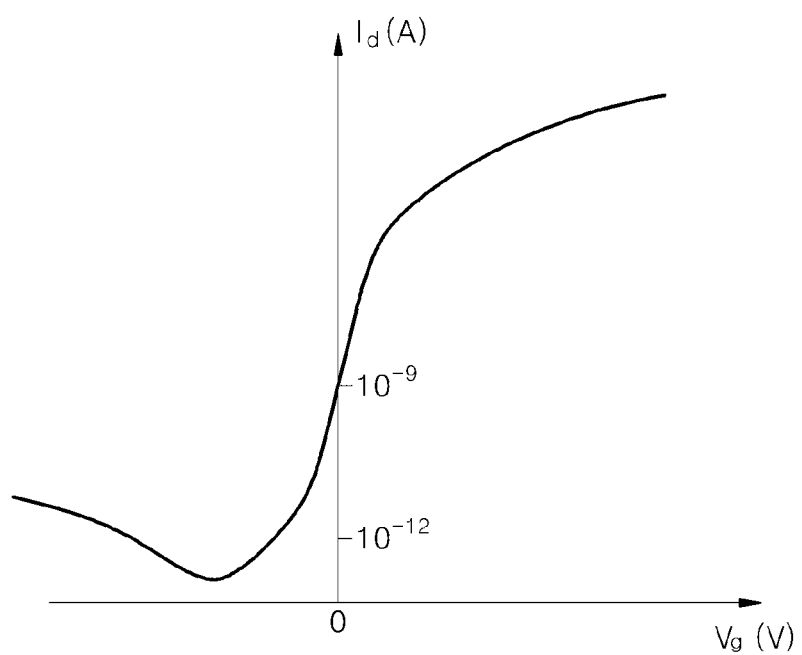

FIG. 5 is a graph of gate voltage (Vg) as a function of drain current (Id) for an amorphous silicon TFT in a conventional liquid crystal display (LCD) apparatus. Referring to FIG. 5, leakage current at a gate voltage of about 0V and minimum leakage current are respectively about $10^{-9}$ A and about $10^{-13}$ A. Although leakage current at a gate voltage of about 0V may be minimized by adjusting threshold voltage of the amorphous silicon TFT (shifting the graph of FIG. 5 to the right), a VHT may be about several seconds, because the minimum leakage current of a conventional TFT may be increased over the minimum leakage current of example embodiments.

Figure 6B:
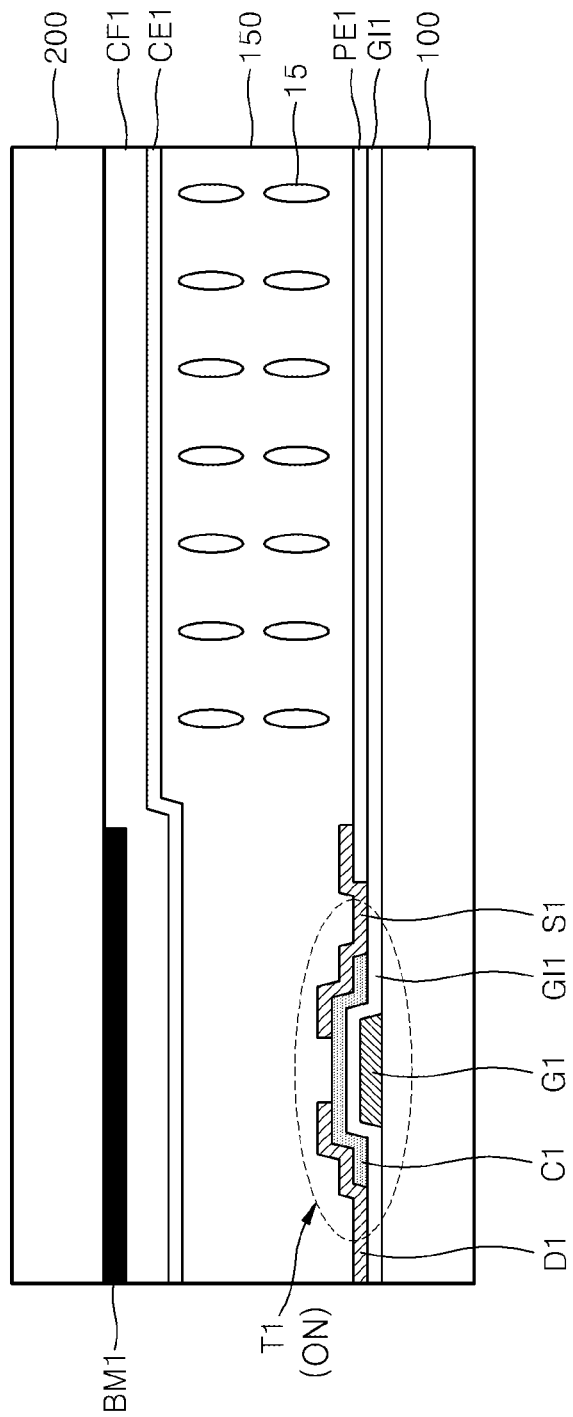

Hereinafter, methods of operating display apparatuses according to example embodiments will be described with reference to FIGS. 6A-6C. FIG. 6A is a diagram of a display apparatus in an initial state. In the initial state, liquid crystal molecules 15 of a liquid crystal layer 150 may be horizontally aligned in a line. However, an aligned status of the liquid crystal molecules 15 is not limited thereto. Referring to FIG. 6B, if a TFT T1 is turned on, when a voltage is applied to a common electrode CE1 an electric potential difference may be generated between the common electrode CE1 and a pixel electrode PE1 so that the aligned status of the liquid crystal molecules 15 may be changed. In FIG. 6B, the liquid crystal molecules 15 are shown vertically aligned but the aligned status of the liquid crystal molecules 15 is not limited thereto. The operation of FIG. 6B may be a screen scan.

Figure 6C:
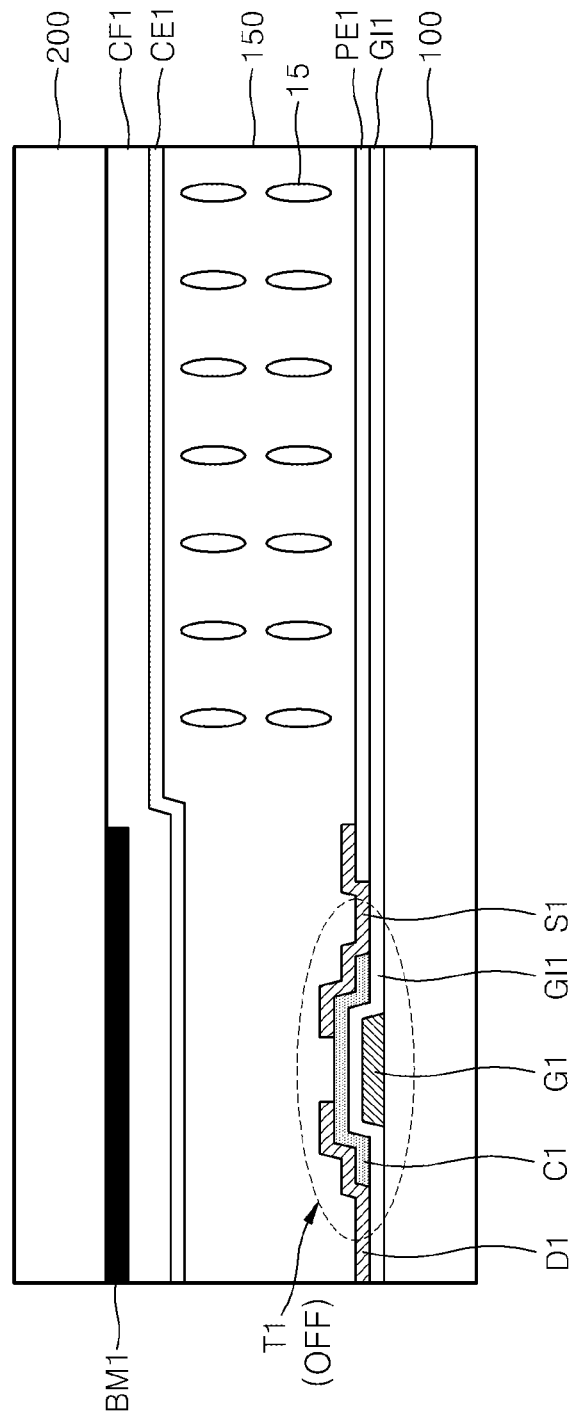

Referring to FIG. 6C, after operation of FIG. 6B is performed (e.g., screen scan), the TFT T1 may be turned off. The TFT T1 of the display apparatus according to example embodiments may have a relatively small and/or decreased leakage current. Although the TFT T1 is turned off, the electric potential difference between the common electrode CE1 and the pixel electrode PE1 may be maintained during a relatively long and/or increased period of time. Consequently, the aligned status of the liquid crystal molecules 15 may be maintained and an image realized via the screen scan may be continuously displayed, for a relatively long and/or increased period of time. In order to turn off the TFT T1, a specific voltage may be applied to a gate electrode G1 of the TFT T1 or power to the display panel may be turned off. A voltage for turning off the TFT T1 may be, for example, a negative (−) voltage or about 0V. The negative voltage may correspond to a TFT described with respect to FIG. 3 and the about 0V may correspond to a TFT described with respect to FIG. 4. Although not illustrated in FIGS. 6A-6C, a refresh scan may be performed to re-apply the voltage between the common electrode CE1 and the pixel electrode PE1 by turning on the TFT T1 during a VHT.

Technology related to a conventional LCD apparatus may also be applied to a display apparatus according to example embodiments. For example, a display apparatus according to example embodiments may be of a transmissive type having a backlight, a reflective type having a reflective layer, and/or a transflective type having both a reflective area and a transmissive area. The display apparatus according to example embodiments may separately or simultaneously realize a still image and/or a moving picture, and may realize a color image and/or a monochrome image. The display apparatus according to example embodiments may be a flexible display apparatus including a flexible substrate.

While example embodiments have been particularly shown and described, it will be understood by one of ordinary skill in the art that variations in form and detail may be made therein without departing from the spirit and scope of the claims. It will be understood that the example embodiments should be considered in a descriptive sense only and not for purposes of limitation. For example, it will be understood by those of ordinary skill in the art that the structures of FIGS. 1 and 2 may vary and the methods of FIGS. 6A-6C may be variously altered. The concepts of example embodiments may be applied to other display apparatuses in addition to an LCD apparatus. Descriptions of features or aspects within each embodiment should typically be considered as available for other similar features or aspects in other embodiments.

What is claimed is:

1. A display apparatus comprising:
a first substrate including a TFT (thin film transistor) and a pixel electrode connected to the TFT, the TFT having a channel layer including GaInZnO, the TFT being configured to maintain a display image for longer than 10 ms after switching to an off-state, an off-state leakage current of the TFT is less than $10^{-14}$ A, and the display apparatus has a voltage holding time (VHT) exceeding 10 ms;
a second substrate including a common electrode facing the first substrate; and
a liquid crystal layer between the first substrate and the second substrate.

2. The display apparatus of claim 1, wherein an off-state leakage current of the TFT is less than $10^{-17}$ A.

3. The display apparatus of claim 1, wherein the TFT is configured to maintain a display image for longer than or equal to $10^2$ sec after switching to an off-state.

4. The display apparatus of claim 1, wherein the TFT is an enhancement mode TFT.

5. The display apparatus of claim 1, wherein the TFT is a depletion mode TFT.

6. The display apparatus of claim 1, wherein the display apparatus is one of a transmissive type, a reflective type, and a transflective type.

7. The display apparatus of claim 1, further comprising:
a capacitor on the first substrate,
wherein the display apparatus is configured to maintain a charge on the capacitor for longer than about 10 ms after the TFT is switched to the off-state.

8. The display apparatus of claim 1, wherein the TFT is one of a bottom gate TFT, a top gate TFT and a double gate TFT.

9. The display apparatus of claim 1, wherein the TFT has a double gate structure.

10. A digital picture frame, comprising the display apparatus of claim 1.

11. Electronic paper (e-paper), comprising the display apparatus of claim 1.

12. A method of operating a display apparatus comprising a first substrate including a TFT and a pixel electrode connected to the TFT, a second substrate including a common electrode facing the first substrate, and a liquid crystal layer between the first substrate and the second substrate, the display apparatus has a voltage holding time (VHT) exceeding 10 ms, the method comprising:
applying a voltage between the pixel electrode and the common electrode by turning on the TFT for displaying an image;
turning off the TFT by biasing the TFT to an off-state leakage current of less than $10^{-14}$ A; and
performing a refresh operation to the TFT in an off-state to maintain the image, wherein an interval of the refresh operation is longer than 10 ms.

13. The method of claim 12, wherein the interval of the refresh operation is longer than about $10^2$ sec.

14. The method of claim 12, wherein the interval of the refresh operation is from about $10^2$ sec to about $10^6$ sec.

15. The method of claim 12, wherein turning off the TFT includes applying one of a negative (−) voltage and about 0 volts.

16. The method of claim 12, wherein the TFT is an oxide TFT.

17. The method of claim 16, wherein a channel layer of the TFT includes one of a ZnO-based material, an InO-based material and a SnO-based material.

18. The method of claim 12, wherein the TFT has a channel layer including GaInZnO.

19. The method of claim 12, wherein the TFT has a double gate structure.

20. The method of claim 12, wherein the display apparatus is a digital picture frame.

21. The method of claim 12, wherein the display apparatus is an electronic paper (e-paper).

* * * * *